United States Patent [19]

Stangeland et al.

[11] Patent Number: 5,690,896
[45] Date of Patent: Nov. 25, 1997

[54] DISTRIBUTOR ASSEMBLY FOR MULTI-BED DOWN-FLOW CATALYTIC REACTORS

[75] Inventors: Bruce E. Stangeland, Berkeley; Krishniah Parimi, Concord; Dennis R. Cash, Novato, all of Calif.

[73] Assignee: Chevron U.S.A. Inc., San Francisco, Calif.

[21] Appl. No.: 435,564

[22] Filed: May 5, 1995

[51] Int. Cl.⁶ .................................................. B01J 8/04
[52] U.S. Cl. .................... 422/191; 422/195; 422/311; 261/21; 261/114.5
[58] Field of Search .................. 422/191, 195, 422/311; 261/21, 114.5, 114.1

[56] References Cited

U.S. PATENT DOCUMENTS

| | | | |
|---|---|---|---|
| 2,327,993 | 8/1943 | Bragg | 261/114 |
| 3,017,950 | 1/1962 | Koshoot . | |
| 3,353,924 | 11/1967 | Riopelle . | |
| 3,353,929 | 11/1967 | Knacke et al. . | |
| 3,592,612 | 7/1971 | Ballard et al. | 422/191 |
| 3,598,541 | 8/1971 | Hennemuth et al. | 422/191 |
| 3,705,016 | 12/1972 | Ludwigsen et al. . | |
| 3,787,189 | 1/1974 | Muffat et al. . | |
| 3,977,834 | 8/1976 | Alcock et al. | 422/191 |
| 4,182,741 | 1/1980 | Carson et al. | 422/211 |
| 4,233,269 | 11/1980 | Kaye et al. | 422/207 |
| 4,238,426 | 12/1980 | Slobodyanik | 202/158 X |
| 4,578,248 | 3/1986 | Nagaoka | 422/310 |
| 4,764,347 | 8/1988 | Milligan | 422/113 |
| 4,836,989 | 6/1989 | Aly et al. | 422/195 |
| 4,960,571 | 10/1990 | Bhagat et al. | 422/194 |
| 5,152,967 | 10/1992 | Rossetti et al. | 422/194 |
| 5,403,560 | 4/1995 | Desphpande et al. | 422/190 |
| 5,462,719 | 10/1995 | Pedersen et al. | 422/195 |
| 5,484,578 | 1/1996 | Muldowney et al. | 422/220 |

FOREIGN PATENT DOCUMENTS

| | | | |
|---|---|---|---|
| 0462753-A | 12/1991 | European Pat. Off. | B01J 8/04 |
| 1486678-A | 6/1967 | France . | |
| 2277888 | 11/1994 | United Kingdom | B01J 8/04 |

*Primary Examiner*—Christopher Kim
*Attorney, Agent, or Firm*—A. Stephen Zavell; Tom J. McNaughton; W. Keith Turner

[57] ABSTRACT

A multi-bed, down-flow reactor includes several distributor assemblies, each having a centrally located mixing chamber and an annular collecting and mixing trough surrounding the mixing chamber. The mixing chamber has an inlet at one side thereof, an outlet in its bottom wall, and a quench gas inlet in its top wall above the outlet. A divider wall traverses the annular trough adjacent to the inlet to cause the pool of liquid collected in the trough to flow in a circular pattern around the mixing chamber to the inlet. This ensures that the liquid circulating through the trough is well mixed with the liquid raining down from the catalyst bed. Turbulent and spiraling flow patterns generated within the chamber further mix the liquid and gas and entrain quench gas in the liquid and gas stream.

18 Claims, 3 Drawing Sheets

DISTRIBUTOR ASSEMBLY FOR MULTI-BED DOWN-FLOW CATALYTIC REACTORS

FIELD OF THE INVENTION

This invention relates to a distributor assembly for multi-bed, down-flow catalytic reactors, that is, reactors which include vertically superimposed packed beds of particulate catalytic material and wherein a liquid or liquid and gas mixture is processed as it flows down through the packed beds. This type of reactor is used in the petroleum and chemical processing industries for carrying out various catalytic reactions, such as hydrotreating, hydrofinishing, hydrocracking, and dewaxing.

BACKGROUND OF THE INVENTION

Multi-bed, down-flow catalytic reactors are used in the petroleum and chemical industries for a variety of processes. In the petroleum refining industry, multi-bed, down-flow reactors are used in processes for hydrotreating, hydrodesulfurization, hydrofinishing, hydrocracking, and dewaxing. In these processes, the process liquid is mixed with a gas or vapor and this multiple phase mixture is passed through the packed catalyst beds. Because such reactions may consume some of the reactants, additional vaporous reactants, for example, hydrogen, may be injected at several points along the path of the liquid and gas through the reactor. Also, large amounts of heat may be generated due to exothermic reactions, and quench media may be added to regulate the temperature in the reactor. As the liquid and gas mixture flows through a catalyst bed, some maldistribution of temperature and reactant concentration often develops across each bed. Unless this is mitigated, the reactor operation would be inefficient and hot spots may develop that could potentially force premature reactor shutdown and therefore plant shutdown. It is therefore necessary to provide reactor internals for collecting and mixing the liquid and gas exiting from one bed before distribution to the next bed, so that any such maldistribution is not propagated from one catalyst bed to the next. To accomplish this, distributor assemblies are used between the catalyst beds to ensure that the distribution of the liquid and gas mixture (and as the case may be, the vaporous reactant or quench gas) across each bed is as uniform as possible in both composition and temperature. By providing such uniform distribution, each bed will be efficiently utilized and the desired catalytic reactions will take place in a more predictable manner.

Numerous types of distributor assemblies for multi-bed, down-flow reactors are known in the prior art. One example is shown in U.S. Pat. No. 4,836,989, in which the distributor assembly comprises a collector tray arranged below a catalyst bed and a distributor tray is mounted under the collector tray. The distributor tray is fed by spillways which provide several passageways for the liquid collected on the collector tray, as well as quench gas injected between the distributor tray and the catalyst bed. The spillways have outlets below the collector tray which face sideways and tangentially into an annular mixing chamber located under the collector tray. The outlets are described as imparting a swirling motion to the liquid in the annular mixing chamber that promotes good mixing and temperature equilibrium. Further mixing apparatus is provided below the mixing chamber to collect and distribute liquid over the underlying catalyst bed.

Another type of a distributor assembly, as shown in U.S. Pat. No. 4,960,571, includes a collector plate that has a central opening therein. A quench mixing zone is provided under the collector plate, in which a second plate having openings formed in an annular outer portion thereof is mounted under the collector plate, with the annular portion thereof being situated radially outwardly of the central opening in the collector plate. Baffles are affixed to the annular portion and arranged at a tangential angles and in concentric rings to induce current eddies in the liquid and gas flowing through the annular portion.

Examples of other types of distributor assemblies for multi-bed, down-flow reactors are described in U.S. Pat. Nos. 3,705,016, 3,977,834, and 4,182,741.

SUMMARY OF THE INVENTION

According to the present invention, a distributor assembly for use in a multi-bed down-flow reactor includes a generally annular trough for collecting and mixing liquid and gas flowing from an overlying catalyst bed 100, and a chamber disposed centrally within the annular trough for receiving liquid from the trough and further mixing the liquid and gas. The mixing chamber has at least one inlet for receiving liquid from the trough and at least one outlet for directing flow toward the underlying catalyst bed 200. A divider wall traverses the trough from a position adjacent to the inlet to divert collected liquid from the inlet and cause the liquid to circulate around a substantial portion of the periphery of the mixing chamber prior to reaching the liquid inlet. A single inlet and a single divider wall adjacent to the inlet may be employed, whereby the pool of liquid that is collected adjacent to the divider wall circulates around substantially all of the periphery of the mixing chamber prior to reaching the inlet. Liquid flowing from the catalyst bed is thus collected and mixed with the pool of liquid coursing through the trough from the divider wall to the mixing chamber inlet.

Another aspect of the invention is that the mixing chamber may have a single outlet formed centrally in the bottom wall thereof, and the mixing chamber inlet may comprise a passageway which projects into the mixing chamber at an orientation relative to the outlet to impart a spiraling or rotating flow pattern within the chamber that is additive to the circular flow pattern generated within the annular collecting and mixing trough. The inlet passageway is preferably shaped to impart turbulence to the flow upon entry into the mixing chamber, and a partially cylindrical baffle is preferably mounted within the mixing chamber to form an annular passageway around the outlet which induces further spiralling or rotating flow of the liquid and gas within the chamber downstream of the inlet passageway. The orientation and shape of the inlet passageway and the annular passageway within the mixing chamber cooperate to induce robust, relatively high energy mixing of the liquid and gas.

Quench gas or fluid may be injected at multiple points into the pool of liquid in the mixing trough. Another aspect of the invention is that a gas inlet is preferably formed in the top wall of the mixing chamber overhead the outlet. Quench gas is entrained in the liquid being processed, first, at the points of injection into the liquid pool collected within the mixing trough and, second, by means of the turbulent and spiraling flow patterns generated within the mixing chamber.

These and other features of the present invention will be more readily understood upon reading the following "Detailed Description of the Preferred Embodiment" in conjunction with the accompanying drawings.

DETAILED DESCRIPTION OF THE PREFERRED EMBODIMENT

Figure 1:
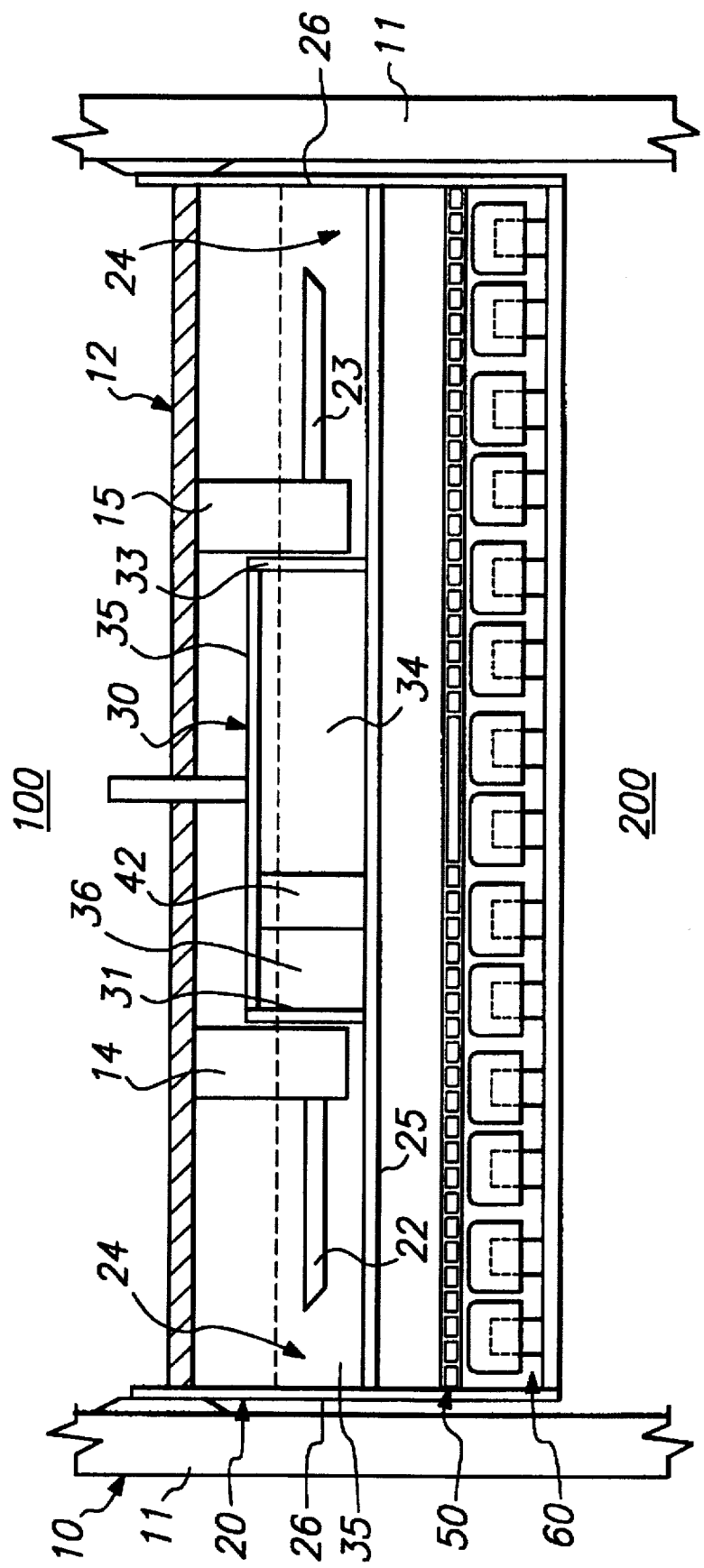
FIG. 1 is a schematic, vertical, sectional view of a preferred embodiment of distributor assembly according to the present invention.
Figure 2:
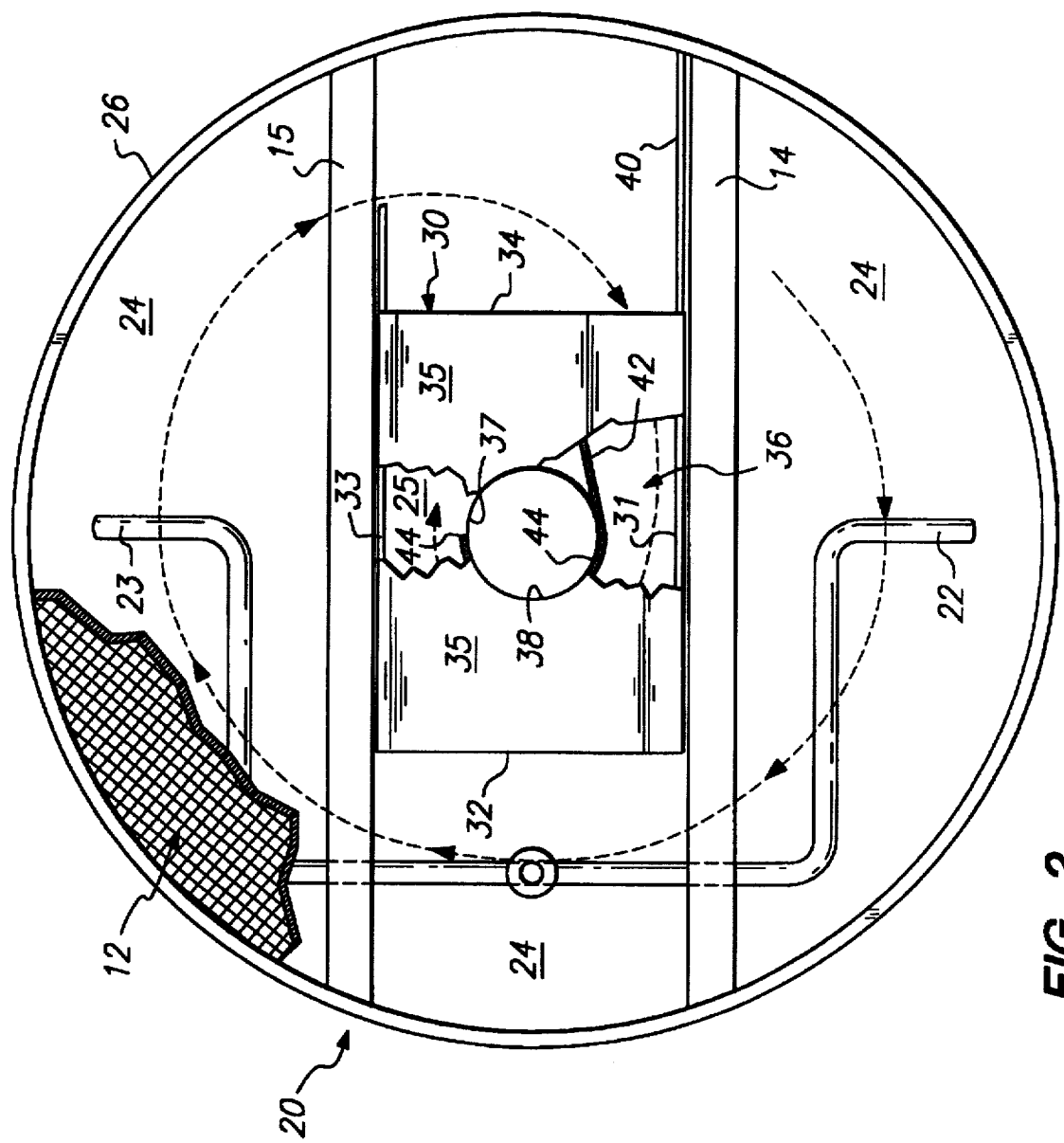
FIG. 2 is a top plan view of the preferred embodiment of the distributor assembly according to the present invention.
Figure 3:
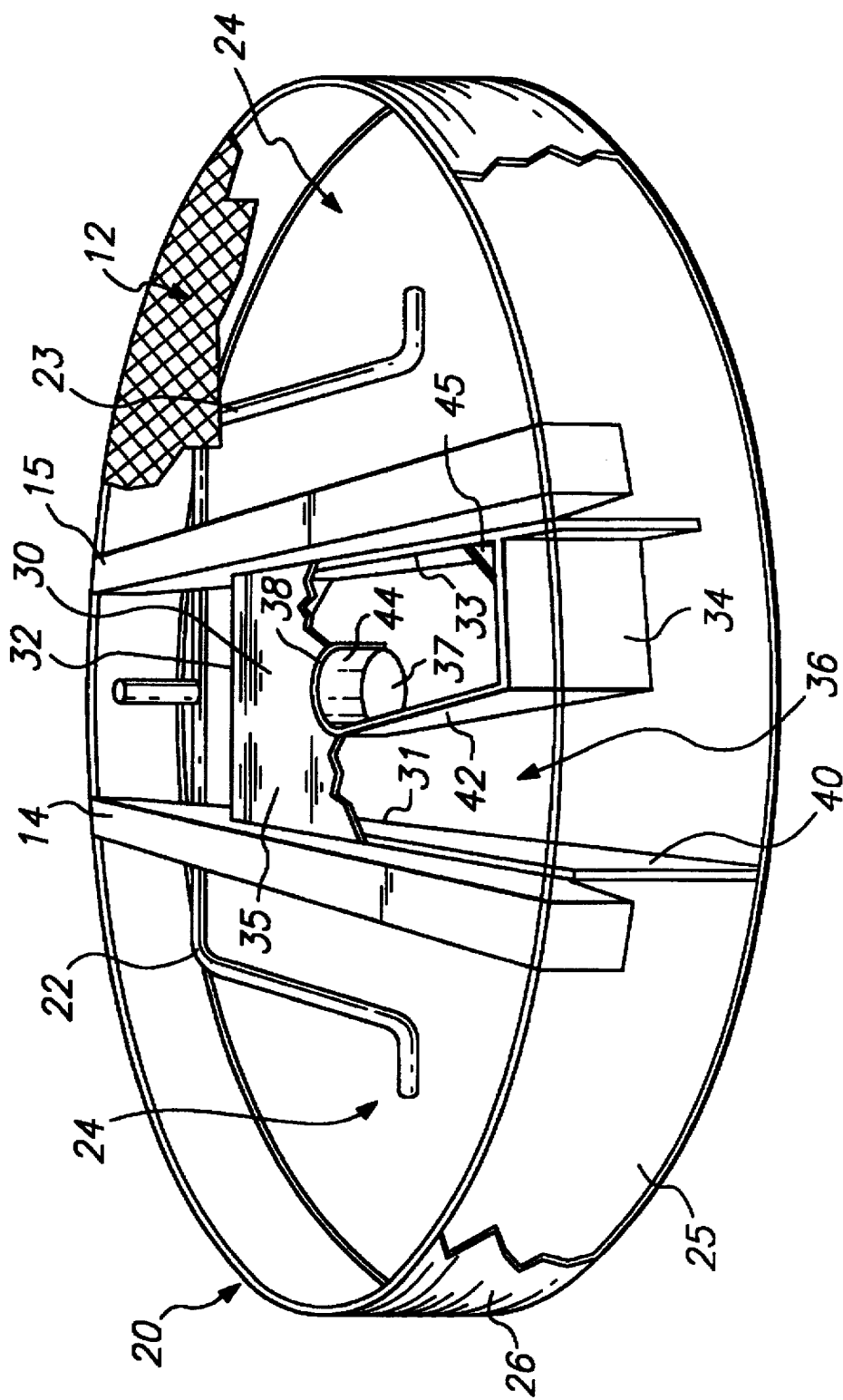
FIG. 3 is a schematic, perspective view of the preferred embodiment of the distributor assembly according to the present invention.

As shown in FIGS. 1–3, a multi-bed, down-flow reactor 10 has a cylindrical sidewall 11. The section shown in FIG. 1 is taken in the region between vertically superimposed catalyst beds (not shown) containing packed particulate catalytic material. Each catalyst bed is supported on a grid screen assembly 12 comprised of a support grid, space cloth and wire screen, all of which are well known in the art. The grid screen assembly is mounted on parallel cross beams 14 and 15 that are horizontally mounted to the reactor wall 11. The distributor assembly 20 of the present invention is mounted to the sidewall 11 under the grid screen assembly 12 to receive liquid and gas flowing down from the entire bottom surface of the overlying catalyst bed and to mix the liquid and gas. The distributor assembly 20 distributes the resultant mixture to a perforated plate 50 which, in turn, distributes the liquid and gas, as well as quench gas, over the cross section of the reactor to a bubble cap assembly 60 which is mounted under the perforated plate 50, which further mixes the liquid and gas, as well as quench gas, and distributes the resultant liquid-gas mixture across the upper surface of an underlying catalyst bed (not shown).

In certain hydrocarbon processing applications (for example, hydrodesulphurization), quench gas is injected into the liquid and gas being processed. Quench gas may be injected to control the temperature and also the composition of the liquid and gas mixture (e.g., to provide hydrogen excess) that is distributed across the underlying catalyst bed. In the preferred embodiment shown in FIGS. 1 through 3, quench fluid or gas (for example, hydrogen) is injected at two points into the liquid by quench gas pipes 22 and 23 (as described in more detail below). The distributor assembly 20 also functions to entrain quench gas in the liquid and gas received from a catalyst bed and to distribute the liquid-gas mixture to the perforated plate 50 and bubble cap assembly 60 for distribution over the cross section of the underlying catalyst bed.

The distributor assembly 20 is horizontally mounted to the reactor wall 11 and includes a generally annular collecting and mixing trough 24. Trough 24 includes a bottom wall formed by a flat circular bottom wall or plate 25 and an upright, cylindrical, peripheral wall 26. Plate 25 is horizontally mounted under the grid screen assembly 12. The distributor assembly 20 further includes a mixing chamber 30 having side walls 31, 32, 33, and 34 that are mounted in fluid-tight relation to the upper surface of the plate 25 at the center thereof. The annular collecting and mixing trough 24 is formed on the plate 25 between the side walls of mixing chamber 30 and peripheral wall 26 to collect liquid flowing down from the overlying catalyst bed and mix the liquid prior to reaching the inlet passageway 36 of the mixing chamber.

The mixing chamber 30 has a box-like shape adapted to extend upwardly from the plate 25 between the pair of cross beams 14 and 15 that support the overlying catalyst bed. In the preferred embodiment, the mixing chamber 30 is rectangular in top plan and extends longitudinally of the cross beams and has a width adapted to occupy the space between the cross beams. The mixing chamber is formed by longitudinally extending side walls 31 and 33 that are respectively mounted inwardly of, and adjacent to, the interior surfaces of the cross beams 14 and 15, by transversely extending side or end walls 32 and 34, and by a rectangular top wall 35. The bottom wall of the mixing chamber is formed integrally with, and comprises a central portion of, the collector plate 25. That is, the bottom wall of the trough 24 and the bottom wall of mixing chamber are both formed by the plate 25, and thus both lay in the same horizontal plane. The plate 25 of the annular trough 24 is mounted under and in close proximity to the cross beams so that the mixing chamber 30 is disposed between the central pair of cross beams, to thereby minimize the vertical space taken up by the distributor assembly 20 and thus make efficient use of overall volume of the reactor 10 and thus permit higher catalyst fill volume.

In the preferred embodiment, the mixing chamber 30 has a single inlet passageway 36 extending from the end wall 34 and a single outlet 37 in the bottom center of the bottom wall 25. Inlet passageway 36 has an upstream end forming an rectangular outlet opening in the inner wall 26 of the trough 24. The outlet opening in the trough is formed at its top and bottom by the top wall 35 of the mixing chamber and plate 25 and at its sides by the inner surface of side wall 31 and the inner edge of end wall 34. Outlet 37 comprises a circular aperture formed at the center of the collector plate 25 coaxially with the axis of the reactor side wall 11. A gas inlet 38 is formed in the center of the top wall 35 directly overhead the outlet 37. As best seen in FIGS. 2 and 3, the side wall 31 projects outwardly from the mixing chamber 30 to the peripheral wall 26 of the trough 24 to thereby form a divider wall 40 which traverses the trough 24 adjacent to the inlet passageway 36. That is, the divider wall 40 is formed integrally with the sidewall 31 and is thus contiguous to the radially (relative to the axis of the reactor and outlet 37) outer edge of the inlet 36. The divider wall 40 projects outwardly from the mixing chamber inlet 36 to traverse the trough 24. The bottom edge of the divider wall 40 forms a substantially fluid-tight seal with the plate 25, and the outer end of wall 40 forms a generally fluid-tight seal with the inner surface of the peripheral wall 26 of the trough.

The divider wall 40 diverts liquid collected in the mixing trough 32 adjacent to the inlet 36 and causes the pool of liquid collected and accumulated in the trough 24 to flow in an arcuate or circular pattern (shown by dashed outline in FIG. 2) around substantially the entire periphery of the mixing chamber prior to reaching the inlet 36. That is, the pool of liquid flows in an arcuate path that subtends an angle of roughly 360 degrees, excluding only the arcuate width of the upstream opening to the inlet passageway 36. As liquid rains down at various locations into the annular mixing trough 24, the circular flow pattern in the horizontal plane of the trough induces relatively low energy mixing of the liquid in the pool with that liquid raining down from the catalyst bed, so that the liquid entering inlet 36 has relatively uniform temperature and composition. The size of the inlet passageway 36, particularly, the width and height of the downstream end thereof (i.e., at the downstream edge of the inner passageway wall 42, as shown in FIG. 3), is selected in view of the operating range of flow rate of liquid through the reactor 10, in order to cause the operating liquid level (shown in dashed outline in FIG. 1) to be somewhat lower than top wall 35 of the mixing chamber 30 to form a gap between the liquid pool and top wall 35. It will thus be seen that a pool of liquid of substantial depth is accumulated in the trough by means of the constricted inlet passageway 36 to the mixing chamber, which, due to the fact that the mixing chamber is contiguous to and forms the inner wall of the collecting and mixing trough, the chamber inlet 36 comprises a restricted outlet to the trough 24. It can thus be seen that the distributor assembly 20 comprises an annular collecting and mixing trough 24 that includes at least one divider wall 40 which traverses the trough, and the trough has an outlet opening adjacent, or in close proximity, to the divider wall at the downstream end of the trough that leads to the constricted passageway 36. Passageway 36 restricts the flow of liquid from the trough to cause liquid to accumulate in the trough and that also, by virtue of the constriction of the flow and expansion downstream thereof imparts turbulence to the liquid and gas stream exiting therefrom.

As may be seen in FIGS. 2 and 3, the inlet passageway 36 to the mixing chamber 30 extends along a path that is adjacent to the periphery of the chamber and that is radially offset from the axis of the reactor wall 11 and that is also tangential to the circular outlet 37 formed in the bottom wall 28 of the mixing chamber. This orientation relative to the outlet 37, together with the annular shape of the flow passageway within the mixing chamber, imparts a rotating or spiraling flow pattern to the liquid and gas that is additive to the rotating or circular flow pattern generated within the annular trough 24. Also, the inlet passageway 36 is tapered or converges in the direction of flow of liquid and gas from the trough 32 into the chamber 30, to thereby induce turbulence in the flow as the liquid and gas flows through the constricted downstream end of the inlet passageway into the mixing chamber. The passageway is formed by the flat chamber side wall 31 and a flat inner wall 42 that extends from the edge of, and forms an obtuse angle with, the transverse end wall 34 of the mixing chamber. Wall 42 forms an acute angle with side wall 31. The downstream end of wall 42 is contiguous to the outlet 37 and lies generally at the intersection of a plane that divides that chamber into upstream and downstream portions, which plane extends transversely of the chamber 30 and intersects the axis of the outlet 37 and thus contains the axis of the reactor wall 11.

A semi-cylindrical baffle wall 38 is mounted in the upstream portion of the mixing chamber 30. Baffle 38 extends from the downstream edge of the inner inlet passageway wall 42, to thereby open away from the sidewall 31. The shape of the inlet 36 and the expanding flow path formed between the semi-cylindrical wall 38 and the sidewall 31 induces turbulence to the flow immediately downstream of the passageway 36. An annular passageway is formed within the upstream end portion of the chamber 30 between the semi-cylindrical baffle and the chamber walls 31, 32, and 33 and is continued into the downstream end portion of the chamber subsequently by the U-shaped arrangement formed by walls 33 and 34 and the inlet wall 42. The tangential or radially offset arrangement of the inlet passageway and the annular passageway within the mixing chamber, all cooperate to induce a circular or spiralling flow pattern which thoroughly mixes the liquid and gas.

Quench gas (for example, hydrogen) is injected by pipes 22 and 23 at two points into the pool of liquid collected within the collecting and mixing trough 24. As shown by dashed outline in FIG. 1, the operating liquid level is lower than the height of the sidewalls of the mixing chamber 30, that is, below the top wall of the mixing chamber. The ends of the quench pipes 22 and 23 project into the mixing trough at locations below the operating liquid level that are radially displaced from the mixing chamber inlet by approximately 270° and 90°. Quench gas injection at such radially offset locations along the circular flow path in the trough 24 causes agitation of the pool of liquid at each location, to thereby enhance the mixing of liquid falling into and flowing through the trough.

Some quench gas is entrained in the liquid at the points of injection, and the remainder flows upwardly from the pool of liquid in the trough 24 into the gas inlet 38 in the top wall of the mixing chamber 30 and also through inlet passageway 36 above the liquid flowing therethrough. It is noted that the cross beams 14 and 15 are tapered at their outer ends adjacent to the wall 11 of the reactor, and a gap is provided between the upper edge of the divider wall 40 and the lower surface of the adjacent beam 14 where such beam extends outwardly of the mixing chamber. It will be seen the mixing chamber 30 of the preferred embodiment has a rectangular box shape, and the collecting and mixing trough 24 is formed around the mixing chamber on the flat circular plate 25. The sidewalls 31, 32, 33, and 34 of the box-like mixing chamber are mounted in substantially fluid-tight relation to plate 25, so that the radially inner wall of the collecting trough 24 is formed by the sidewalls of the mixing chamber and the peripheral wall 26 of the trough is formed by the wall at the periphery of the collector plate. The mixing chamber has a rectangular top wall 35, and its bottom wall is formed integrally with plate 25. The outlet 37 of the mixing chamber 30 is a circular aperture formed at the center of plate 25 and the axis of the reactor. The catalyst bed is supported on a grid assembly 12 mounted on cross beams 14 and 15, and the collector plate is horizontally mounted under the cross beams in close proximity thereto so that the mixing chamber 30 projects upwardly between, and longitudinally of, the cross beams. This use of the space between the cross beams minimizes the vertical space occupied by the distributor assembly 20 and thus results in efficient use of the overall reactor volume. The inlet passageway 36 is formed at one side by the side wall 31 of the mixing chamber that extends longitudinally of and adjacent to cross beam 14. Divider wall 40 is formed integrally with, and projects outwardly from, the side wall 31 to the peripheral wall 26 and is thus contiguous with the inlet passageway. The inlet passageway 36 is formed at its other side by wall 42 that forms an acute angle with side wall 31, so that the inlet passageway tapers in the direction of flow. Semi-cylindrical baffle wall 44 is mounted coaxially with the reactor axis and also the axis of the circular outlet 37. The upstream edge the baffle 44 extends from the downstream edge of the flat inner wall 42. A turbulent, spiralling flow pattern is initially generated in the upstream end portion of the mixing chamber 30 by the constriction through the tapering inlet passageway 36 and expansion around the upstream portion of baffle 44. Subsequently, further turbulent spiralling flow is generated by constriction between the downstream portion of baffle 44 and the proximal chamber side wall 33 and then expansion as the liquid flows past baffle 44 into the downstream end portion of the mixing chamber. Also, the rotating or spiraling flow pattern is generated by the radially offset and tangential arrangement of inlet passageway relative to the outlet 37, followed by the generally annular passageway formed between the rectangular side walls 31, 32 and 33 at the upstream end portion of the chamber and semi-cylindrical baffle 44. This rotating or spiralling pattern is continued in the downstream end portion of the mixing chamber by the obtusely arranged inner wall 42 that extends tangentially of the outlet. As shown in FIG. 3, flat plates 45 may be arranged to somewhat round the corners within the chamber to thereby streamline the flow and enhance the rotating flow pattern. Such turbulent flow, together with the superimposed rotating or spiraling flow pattern, together provide thorough mixing of the liquid and gas mixture.

In the preferred embodiment, the liquid and gas, as well as quench gas, exiting from the outlet 37 of the mixing chamber is directed to the center of a perforated, flat, collector plate 50 that is mounted below the collecting and mixing trough 24 and mixing chamber 30. The plate 50 has a large number of apertures therein (only some of which are shown for sake of clarity). A bubble cap assembly 60 is mounted under the plate 50 to receive liquid and gas from the perforated collector plate and distribute the liquid and gas mixture across the underlying catalyst bed. Further liquid mixing and liquid-gas entrainment is provided by the combination of the perforated plate and bubble cap assembly. Such bubble cap assembly may be of the type generally described in U.S. Pat. No. 4,836,989, the contents of which is incorporated by reference. The assembly includes a plate mounted under plate 50 and a large number of tubes which project upwardly from the plate and cap mounted at the upper ends of the tubes. Slots are formed at the lower ends of the caps to moderate the size the gas bubbles within the liquid and gas mixture drawn through the tubes. The distribution of the tubes over the cross section of the plate provides for even distribution of the liquid and gas mixture over the underlying catalyst bed.

It is preferred that the several distributor assemblies 20 be oriented within the reactor 10 so that the divider walls 40 of vertically adjacent distributor assemblies are radially offset by 180 degrees, that is, that the divider walls project in diametrically opposed directions. Such offset arrangement of the various distributor assemblies within the reactor will minimize any possibility that, should a hot spot form in one bed in close proximity to the inlet passageway 36 of the mixing chamber 30 of the underlying distributor assembly, such hot spot will not be propagated by such distributor assembly to the next catalyst bed.

The previous description of a preferred embodiment of the present invention is primarily for illustrative purposes, it being recognized that a number of variations might be used which would still incorporate the essence of the invention. Accordingly, reference should be made to the following claims in determining the scope of the invention.

What is claimed is:

1. A distributor assembly for a catalytic reactor including a cylindrical sidewall, two or more catalyst beds, and means mounted to said reactor sidewall for supporting the catalyst beds in vertically superimposed relation to each other to permit liquid and gas to flow from a first catalyst bed to a second catalyst bed, the distributor assembly being mounted within the reactor between said first and second catalyst beds, said distributor assembly comprising an annular trough for collecting liquid flowing down from said first catalyst bed, a box shape mixing chamber disposed centrally within said trough and having an inlet for receiving liquid collected in said trough, said mixing chamber including a partially cylindrical baffle that extends from a second wall of said inlet passageway around a portion of an outlet for directing liquid and gas from said chamber toward said second catalyst bed, said baffle terminating at a downstream end portion that forms a constricted passageway with a proximal side wall of the mixing chamber, to thereby impart a turbulent flow pattern as the liquid and gas flows downstream of said baffle, and a divider wall traversing said trough adjacent to said inlet to cause liquid collected in said trough to circulate through said trough around a substantial portion of said chamber prior to reaching said inlet in order to ensure mixing of liquid from all zones of said first catalyst bed.

2. The distributor assembly of claim 1, wherein said mixing chamber has a single inlet, and said distributor assembly includes a single divider wall adjacent to said inlet, whereby said divider wall causes the liquid to circulate in said trough around substantially all of said mixing chamber prior to reaching said single inlet.

3. The distributor assembly of claim 2, wherein said mixing chamber includes side walls which form the inner wall of said trough, said inlet is contiguous with a side wall of the mixing chamber, and said divider wall is integral with, and extends outwardly from, said side wall.

4. The distributor assembly of claim 3, wherein said mixing chamber inlet comprises an inlet passageway which converges in the direction of flow of the liquid and gas into the mixing chamber, to thereby impart a turbulent flow downstream thereof.

5. The distributor assembly of claim 4, wherein said mixing chamber includes a top wall and a bottom wall, said mixing chamber outlet is formed centrally within said bottom wall, and said inlet passageway is formed between a side wall of said mixing chamber and an inner wall that converges toward said side wall in the direction of flow of the liquid and gas into the mixing chamber, to thereby impart a rotating flow pattern within said mixing chamber.

6. The distributor assembly of claim 5, wherein said mixing chamber has a rectangular box shape, said baffle is semi-cylindrical.

7. The distributor assembly of claim 6, further comprising quench gas injection pipes for introducing quench gas into said trough, and said mixing chamber top wall has gas inlet formed therein directly above said mixing chamber outlet.

8. The distributor assembly of claim 1, wherein said mixing chamber includes a bottom wall, said outlet is formed centrally within said bottom wall of said mixing chamber, and said inlet comprises an inlet passageway that is tangential to said outlet, to thereby induce a rotating flow pattern within said mixing chamber.

9. The distributor assembly of claim 8, wherein said inlet passageway is formed between a side wall of the mixing chamber and an inner wall terminating at the periphery of said outlet, and said divider wall is integral with and extends outwardly from said side wall forming said inlet passageway.

10. The distributor assembly of claim 9, wherein said inner wall of said inlet passageway converges toward said side wall of the chamber forming said inlet passageway, to thereby impart a turbulent flow pattern to the liquid as it enters said mixing chamber.

11. The distributor assembly according to claim 10, wherein said mixing chamber further includes a partially cylindrical baffle that extends from said inner wall of the inlet passageway surrounding a portion of said outlet.

12. The distributor assembly of claim 1 wherein said means for supporting the catalyst beds in vertically superimposed relation to each other includes a pair of beams, said trough and said mixing chamber having bottom walls that lay in the same plane, said mixing chamber having side walls that project upwardly between the cross beams, and said mixing chamber inlet is formed in a side wall of said mixing chamber that extends transversely of said cross beams.

13. The distributor assembly of claim 12, wherein said divider wall is integral with and projects outwardly a side wall of the mixing chamber that extends longitudinally of said mixing chamber.

14. The distributor assembly of claim 13, wherein said outlet is formed in the center of the bottom wall of the mixing chamber, and said mixing chamber inlet comprises a passageway that is tangential to said outlet, to thereby impart a rotating flow pattern within the mixing chamber.

15. The distributor assembly of claim 14, further comprising means for injecting quench gas into said trough, and said top wall of said chamber has a gas inlet formed therein directly above said mixing chamber outlet.

16. A distributor assembly for a catalytic reactor including a cylindrical sidewall, two or more catalyst beds, and means mounted to said reactor sidewall for supporting the catalyst beds in vertically superimposed relation to each other to permit liquid and gas to flow from a first catalyst bed to a second catalyst bed, the distributor assembly being mounted within the reactor between said first and second catalyst beds, said distributor assembly comprising a generally annular trough for collecting liquid flowing downward from said first catalyst bed, a divider wall traversing said trough, and an outlet in said trough adjacent to said divider wall, and means downstream of said outlet for collecting and directing the flow of said liquid to said second catalyst bed inlet, whereby liquid collected in said trough circulates through said trough prior to reaching said outlet, and wherein said means downstream of said outlet for collecting and directing the flow of said liquid to said second catalyst bed includes a box shape mixing chamber disposed centrally within said trough and having an inlet passageway for receiving liquid from said trough outlet, said mixing chamber including, side walls which form the inner wall of said trough, said mixing chamber includes a partially cylindrical baffle that extends from a side wall of said trough, said trough outlet being formed in a side wall of the mixing chamber, said mixing chamber inlet passageway converges in the direction of flow of the liquid and gas into the mixing chamber, to thereby impart a turbulent flow downstream thereof.

17. The distributor assembly of claim 16, wherein said trough has a single outlet, and said distributor assembly includes a single divider wall adjacent to said outlet, whereby said divider wall causes the liquid to circulate through substantially all of said trough prior to reaching said single outlet.

18. The distributor assembly of claim 17, wherein said mixing chamber further includes a top wall and a bottom wall, said mixing chamber outlet is formed centrally within said bottom wall, and said inlet passageway is formed contiguous with a side wall of said mixing chamber and at its opposite side by an inner wall that converges toward said side wall in the direction of flow of the liquid and gas into the mixing chamber, to thereby impart a rotating flow pattern within said mixing chamber.

* * * * *